Aug. 24, 1965
L. NORRIS
3,202,222
TILLAGE MACHINE
Filed Dec. 13, 1963
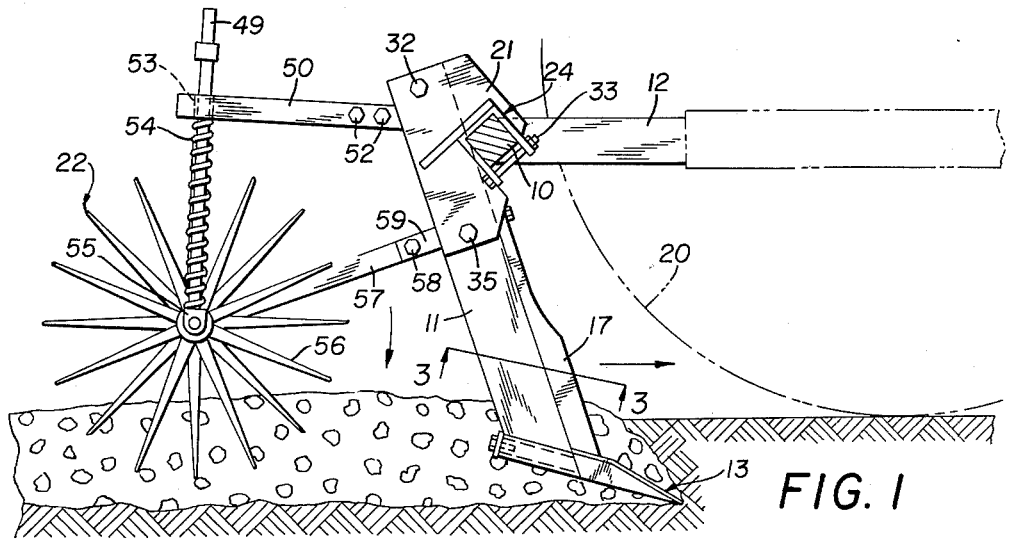
FIG. 1
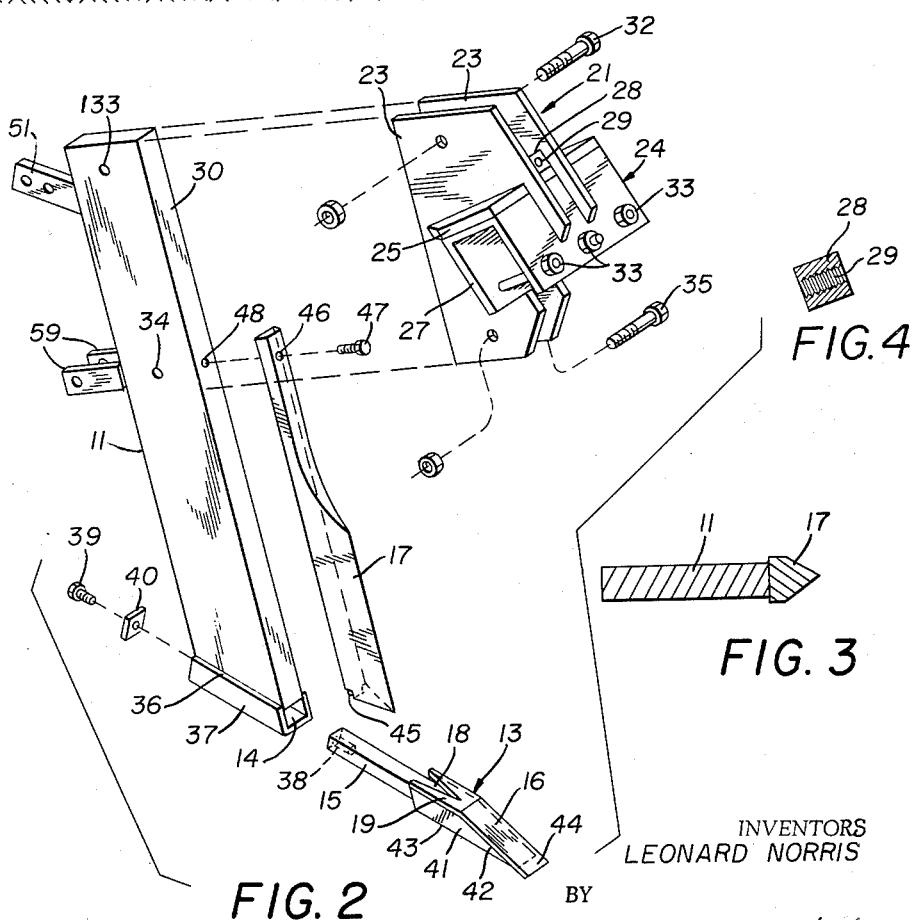
FIG. 2
FIG. 3
FIG. 4
INVENTORS
LEONARD NORRIS
BY
Charles L Lovercheck
ATTORNEY

3,202,222
TILLAGE MACHINE
Leonard Norris, Reinbeck, Iowa
Filed Dec. 13, 1963, Ser. No. 330,291
7 Claims. (Cl. 172—177)

This invention relates to tilling machines and, more particularly, to machines for preparation and conditioning of the soil in connection with the growth of row crops.

The present invention discloses an improved structure of the shoes, supporting blade, and mounting bracket for the device disclosed for attaching to a tractor. The invention also discloses an improved means for adjusting the angularity of the blades to align the shear pin during replacement.

It has been discovered that the bottom surface of the shoe of a subsoil must run from between approximately five degrees upwardly to parallel to horizontal in order to acquire optimum results.

When the angle goes beyond the five degree mark, the draft increases rapidly to the point where the tractor will be overloaded. Also, the load is increased by the diminished angularity of the shoe blade itself. This is also accompanied with less lifting and fracturing effect on the soil which is undesirable. On the other hand, if the above condition is reversed and the bottom surface of the shoe has less than parallel to horizontal position, the penetration is severely restricted. Also, lifting action of the shoe is restricted and it will be difficult to keep the blade at the proper depth and, also, set up a difficulty in entering the ground.

It is accordingly, an object of the invention to provide an improved tilling machine.

Another object of the invention is to provide an improved mounting bracket for a tilling machine blade.

Still another object of the invention is to provide an improved tilling machine blade, shoe, and knife arrangement.

A further object of the invention is to provide an improved combination tilling machine and mulching arrangement.

Yet a further object of the invention is to provide a tilling machine which is simple in construction, economical to manufacture, rugged and durable in construction, and simple and efficient to use.

In the drawing:

FIG. 1 is a side view partly in cross section of a part of a tilling machine according to the invention;

FIG. 2 is an exploded view of the several parts of the blade and mounting bracket therefor;

FIG. 3 is a cross sectional view taken on line 3—3 of FIG. 1; and

FIG. 4 is an enlarged sectional view of the adjusting lug.

Now with more particular reference to the drawing, the tilling machine shown may have several blades such as the blade shown. Two or more blades such as that shown may be attached in a tractor 20 or other suitable vehicle. The tractor may have rearwardly extending arms 12 which will have a suitable arrangement attached thereto for swinging them vertically around their point of attachment to the tractor. This can be any of the well known hydraulic or manual lifting mechanisms commonly in use on present farm tractors and familiar to those skilled in the art.

A square tool bar 10 is shown supported on arms 12. It may also be rectangular in cross section and it is a part of a conventional lifting mechanism on many tractors. The tool bar 10 extends parallel to the axle of the tractor and perpendicular to the direction of travel of the tractor.

Brackets 21 are provided to support the blade 11 to the tool bar. One of these brackets will be provided on the tool bar corresponding to each of the blades 11 and for each of the rotary hoe members 22.

The bracket is made up of the two spaded plates 23 which are fixed in spaced relation so that they snugly receive the blades 11 therebetween. The plates 23 are notched at their front part to receive the channels 24. The channels 24 are welded securely to the plates 23 around their entire outside surface. Gusset plates 25 are welded to the back of the channel on one surface and to the plates 23 along another surface. These gusset plates extend rearwardly behind the legs 27 of the channel. The lug 28 is welded to the back of channel 24 and to the inside of plates 23. This lug has a threaded hole 29 that threadably receives a stud which extends rearwardly and engages the front edge 30 of blades 11. This stud in threaded hole 29 can be used to make a refined adjustment of the position of the blades 11 around the pivot bolt 32 in order to properly align the hole receiving the shear pin during replacement thereof.

The bolts 33 extend through holes in the legs 27 of the channels 24 and these bolts 33 can be tightened to securely lock the bracket to the tool bar 10. Thus, the plates 23 extend behind, above, and in front of the channels 24 and gusset plates 25 reinforce the device laterally to prevent it from being sprung when the blades strike an obstruction such as a stone or the like.

The blades 11 are relatively long plate like members made of heavy steel which may be in the range of one inch thick, four inches wide, and two and one-half feet long. The blades will have the upper hole 133 which will receive bolt 32 and the lower hole 34 which will receive bolt 35. The bolt 35 will be considerably smaller in diameter than bolt 32 so that if the shoe 16 strikes an obstruction, it will shear off the bolt 35 and will not damage the blade or bracket.

The lower end of the blade 11 is inclined relative to the side edges. The lower edge 36 has the channel 37 welded to it. This channel provides a channel opening 14 which is non-circular and, in the embodiment disclosed, is square in cross section. Thus, the square channel opening 14 receives the support member 15 which is attached to the rear end of the shoe 13.

The support member 15 has a threaded opening 38 and this threaded opening 38 receives the stud 39. The stud 39 extends through the opening in washer 40 and washer 40 rests on the rear end of the channel 37 and thus holds the support member 15 firmly therein. The side edges 41 are parallel to each other and slightly wider than the width of the channel 37 so that the sides of the shoe open up a channel in the ground to receive the channel 37.

The front surface 16 of the shoe is inclined downwardly and forwardly at an angle of approximately twenty degrees. It has been discovered that it is important to have the shoe incline at this angle in order for it to operate properly. The side edges of the top of the shoe extend outwardly at 42 and define outwardly extending flanges which may extend outwardly approximately one-eighth of an inch beyond the side edges 34. The front edge of the shoe extends downwardly below the bottom surface 43 to provide a cutting edge which extends forwardly and downwardly from the bottom of the shoe.

The top surface 19 is generally parallel to the bottom surface 43 and the notch 19 is formed in the top surface of the shoe and it extends downwardly and terminates at the top surface of the support member 15.

The knife 17 is generally wedge shaped in cross section and has a sharp cutting leading edge. The lower end of the knife has its width slightly reduced at 45 and its lower end 45 is received in the notch 18. The lower end of knife 17 may rest on top of support 15. This positively locates the bottom end of the knife in position. The top end of the knife has a hole 46 therein that receives a stud 47. This stud 47 is received in a threaded hole 48 in the front surface of the blade. Thus, the stud 47 holds the top end of the knife from moving upwardly or laterally and the lower end 45 is positively located in the notch 18.

The rotary hoe 22 is carried by the rear end of the blade 11 and swings up and down with it. The upper end of the rod 49 is telescopically received in a hole in the arm 50. The arm 50 is bolted to lugs 51 by bolts 52 and the rod 49 is telescopically received in a hole 53 in the arm 50. A compression spring 54 rests its upper end on the bottoms of the arms 50 and its lower end on the top of the axle assembly 55 which, in turn, carries the toothed wheels 56 of the rotary hoe.

The axle is attached to the arm 57 which is swingably mounted to the bolt 58 which is, in turn, disposed between spaced lugs 59 which are welded to the rear end of the blade 11. Thus, when the device is in the ground as shown in FIG. 1 and the wheels 56 encounter increasing resistance, they will compress the spring 54 and swing the arm 57 upward while arm 50 will act as a rigid buffer for the spring 54. On the other hand, when the point of the shoe 13 strikes an obstruction, it may shear the pin 35 and swing backwardly and upwardly around the bolt 32. This will swing the arms 50 and 57 backward and upward and carry with them the wheels 56. The blade 11 itself may have the front surface 16 disposed at approximately twenty degrees from the bottom and, in operation, the bottom surfaces can run from between five degrees to parallel to a horizontal. The front edge of the blade 11 will normally be between twenty-five degrees and thirty degrees to the vertical when in operation. The shoes will ordinarily run approximately 13 inches below the surface of the ground; however, this distance can vary, depending on soil conditions and, in some instances, it may run only slightly deeper than the distance penetrated by the conventional moldboard plow.

The foregoing specification sets forth the invention in its preferred practical forms but the structure shown is capable of modification within a range of equivalents without departing from the invention which is to be understood is broadly noval as is commensurate with the appended claims.

The embodiments of the invention in which an exclusive property or privilege is claimed are defined as follows:

1. In combination, a bracket and a blade for submulching,
said blade comprising a relatively heavy rigid plate like member,
a generally U-shaped member adapted to receive a laterally extending bar comprising part of a tractor hitch,
laterally spaced bolts received in the front edge of the legs of said U-shaped member and adapted to extend through both said legs in front of said bar, rigidly clamping said U-shaped member to said bar,
laterally spaced, vertically extending plates rigidly fixed to said U-shaped member and extending continuously from below said laterally extending bar to a position above it and extending around the back and legs of said U-shaped member,
said laterally spaced plates snugly receiving said blade therebetween,
a round member extending through said plates and said blade at the upper end thereof,
and a round member smaller than said first mentioned round member extending through said plates and through said blade at a position spaced from said first mentioned round member.

2. The combination recited in claim 1 wherein
said U-shaped member extends laterally from both sides of said vertically extending plates,
and a gusset plate is fixed to the outside of each of said vertically extending plate and extends laterally generally at right angles thereto.

3. The combination recited in claim 2 wherein
said blade has spaced lugs fixed to the rear edge thereof,
and rearwardly extending members are fixed thereto for attaching a tillage member thereto.

4. The combination recited in claim 3 wherein
a rearwardly extending arm is swingably attached to the lower of said lugs,
a rotary hoe member is connected to said arm
and a compression spring is attached to the upper said lug and to said rotary hoe member.

5. The combination recited in claim 2 wherein
a lug member is disposed between said vertically extending plates forward of said blade and fixed thereto,
a threaded hole in said lug member,
and a stud in said lug member,
said stud engaging said blade,
said stud being adapted to adjust the position of said blade about said first round member when said smaller round member is removed from said plates.

6. In combination, a bracket and a blade,
said bracket comprising two spaced, vertically extending plates,
said plates having a generally rectangular shaped notch in the front edge extending upwardly and rearwardly therein,
a generally rectangular channel member in said notch fixed to said plates and extending laterally on both sides thereof,
a gusset plate fixed to each said vertically extending plate extending laterally therefrom and overlying the outside bottom of said channel member,
a rigid plate like blade member having its upper end received between said vertically extending plates,
means extending through said vertically extending plates and connecting the upper ends of said plates to said blade member,
and a forwardly extending point on the lower end of said blade member.

7. The combination recited in claim 6 wherein
a lug having a threaded hole therein is disposed between said plates and fixed thereto,
and a threaded stud is disposed in said threaded hole,
said stud engaging the front edge of said blade member at a position spaced from said connection.

References Cited by the Examiner

UNITED STATES PATENTS

| | | | |
|---|---|---|---|
| 290,669 | 12/83 | Dexter | 172—773 |
| 931,125 | 8/09 | James | 172—773 |
| 2,574,385 | 11/51 | Gilreath | 172—177 |
| 2,786,404 | 3/57 | Gardner | 172—193 X |
| 2,904,119 | 9/59 | Hunter | 172—762 |
| 3,026,947 | 3/62 | Larsen et al. | 172—762 |
| 3,042,118 | 7/62 | Norris | 172—551 X |
| 3,140,745 | 7/64 | Hinkle et al. | 37—193 X |

ABRAHAM G. STONE, *Primary Examiner.*

T. GRAHAM CRAVER, ANTONIO F. GUIDA,
*Examiners.*